United States Patent [19]

Yagi et al.

[11] Patent Number: 5,273,350

[45] Date of Patent: Dec. 28, 1993

[54] ANTISKID BRAKE CONTROL METHOD

[75] Inventors: Isao Yagi; Takashi Kushiyama; Jiro Satoh, all of Higashimatsuyama, Japan

[73] Assignee: Jidosha Kiki Co. Ltd., Tokyo, Japan

[21] Appl. No.: 780,514

[22] Filed: Oct. 22, 1991

[30] Foreign Application Priority Data

Oct. 25, 1990 [JP] Japan .................. 2-288111

[51] Int. Cl.$^5$ ............................ B60T 8/32; B60T 8/66
[52] U.S. Cl. ...................... 303/109; 303/100; 303/110
[58] Field of Search ............... 303/96, 102, 103, 105, 303/106, 109, 110, 111, 108; 364/426.02

[56] References Cited

U.S. PATENT DOCUMENTS

| | | | |
|---|---|---|---|
| 4,668,022 | 5/1987 | Sato | 303/100 |
| 4,883,325 | 11/1989 | Shimanuki et al. | 303/96 |
| 4,883,326 | 11/1989 | Sugitani et al. | 364/426.02 |
| 4,984,164 | 1/1991 | Maehara et al. | 303/96 |
| 5,028,095 | 7/1991 | Okubo | 303/103 |
| 5,033,799 | 7/1991 | Braschel | 303/109 |
| 5,092,662 | 3/1992 | Okubo | 308/108 |
| 5,105,359 | 4/1992 | Okubo | 303/103 |
| 5,123,715 | 6/1992 | Okubo | 303/108 |

Primary Examiner—Robert J. Oberleitner
Assistant Examiner—Chris Schwartz
Attorney, Agent, or Firm—Varndell Legal Group

[57] ABSTRACT

A first threshold value of a fixed amount of vehicle velocity arranged on the lower side of the vehicle velocity is set, and a second threshold value of a fixed amount of vehicle velocity also arranged on the lower side of vehicle velocity, which second threshold is greater than that of the first threshold value. The difference between vehicle velocity at maximum recovery velocity of wheel velocity and the maximum recovery velocity of the wheel velocity is compared with the first and second threshold values, and the next point at which a changeover is made to repressurization of brake fluid is altered in dependence upon the results of the comparison. Accordingly, repressurization of the brake cylinder is controlled in dependence upon the condition of the road surface on which the vehicle is traveling, and more appropriate antiskid braking control can be achieved.

4 Claims, 6 Drawing Sheets

ANTISKID BRAKE CONTROL METHOD

BACKGROUND OF THE INVENTION

This invention relates to an antiskid brake control method for controlling the skidding of wheels of an automotive vehicle by repeatedly decreasing and increasing brake hydraulic pressure at the time of braking.

In general, antiskid brake control involves detecting skidding of a wheel at braking, eliminating skidding when this is detected by reducing the braking force acting upon the wheel, and then subsequently increasing the braking force, thereby stabilizing steering of the vehicle and making the braking distance as short as possible.

Conventionally, in antiskid brake control of this kind, brake hydraulic pressure is increased by the braking operation, and vehicle velocity V and wheel velocity $V_W$ gradually diminish. When the wheel velocity $V_W$ attains a value $\alpha$, which is decided by quantities related to wheel skidding, such as slip factor and the degree of wheel deceleration, brake hydraulic pressure starts to be reduced, as shown in FIGS. 6(a) and 6(b). When wheel deceleration gradually diminishes ewing te the decrease in brake hydraulic pressure, the wheel velocity $V_W$ falls to its lowest point A with respect to the vehicle velocity V, recovers and then rises again. When, after recovering, the wheel velocity $V_W$ attains a value $\beta$, which is decided by the aforementioned quantities relating to skidding, brake hydraulic pressure P is increased again and the braking force is enlarged. Consequently, the degree of recovery of the wheel velocity $V_W$ declines, and wheel velocity $V_W$ recovers to the maximum extent at point B, after which it diminishes again. Antiskid braking control is carried out by thus repeating this decrease and increase in brake hydraulic pressure as appropriate.

However, in such antiskid brake control according to the prior art, the value $\beta$ at which there is a changeover from the decrease in brake hydraulic pressure P to repressurization is decided merely by satisfying certain fixed conditions. Accordingly, in the conventional antiskid brake control apparatus, repressurization at $\beta$ is performed indiscriminately without relation to a change in the condition of the road surface, the frictional coefficient $\mu$ of which can take on various values (e.g., the road on which the vehicle is traveling at any moment can be a high-$\mu$ road, intermediate- or mecium-$\mu$ road or low-$\mu$ road, etc.). As a result, optimum antiskid brake control cannot always be carried out.

SUMMARY OF THE INVENTION

An object of the present invention is to provide an antiskid brake control method through which optimum antiskid brake control can be performed by taking account of changes in the conditions of the road surface on which the vehicle is traveling.

According to the present invention, the foregoing object is attained by providing a method of performing antiskid brake control of an automotive vehicle by repeating operations of decreasing brake cylinder pressure of a wheel when skidding of the wheel is detected at braking, and increasing brake cylinder pressure again when wheel velocity of the wheel recovers and elimination of skidding of the wheel is detected, on the lower side of the vehicle velocity, setting a second threshold value as a fixed amount of vehicle velocity arranged on the lower side of the vehicle velocity which is greater than that of the first threshold value, comparing, with the first and second threshold values, a difference between vehicle velocity at maximum recovery velocity of wheel velocity and the maximum recovery velocity of the wheel velocity, and altering an ensuing changeover point, at which the brake cylinder pressure is increased again, in dependence upon results of the comparison.

In accordance with the antiskid brake control method according to the invention constituted as described above, the next changeover point at which the increase in brake cylinder pressure is performed again is changed in dependence upon the difference between vehicle velocity prevailing at the maximum recovery velocity of wheel velocity and this maximum recovery velocity of wheel velocity. In other words, the next changeover point is altered in dependence upon the prevailing condition of the road surface. Accordingly, the repressurization of the brake cylinder is controlled reliably in conformity with the change in the condition of the road surface thus making it possible to perform more appropriate antiskid brake control.

By way of example, when the above-mentioned difference is equal to or less than the first threshold value, namely when the vehicle is traveling on a high-$\mu$ road, the next point at which the changeover is made to repressurization of the brake cylinder is made earlier to increase the braking force sooner, thereby making it possible to enhance brake feeling.

When the difference is greater than the first threshold value and equal to or less than the second threshold value, the previous changeover point mentioned above is maintained and the next changeover point is not changed.

Furthermore, when the difference is greater than the second threshold value, namely when the vehicle is traveling on a low-$\mu$ road, the changeover point is delayed so that the brake pressure is increased at a later time. As a result, front-wheel velocity is made to approach vehicle velocity as much as possible so that steering of the vehicle can be improved.

Still other objects and advantages of the invention will in part be obvious and will in part be apparent from the specification. The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENT

Figure 1:
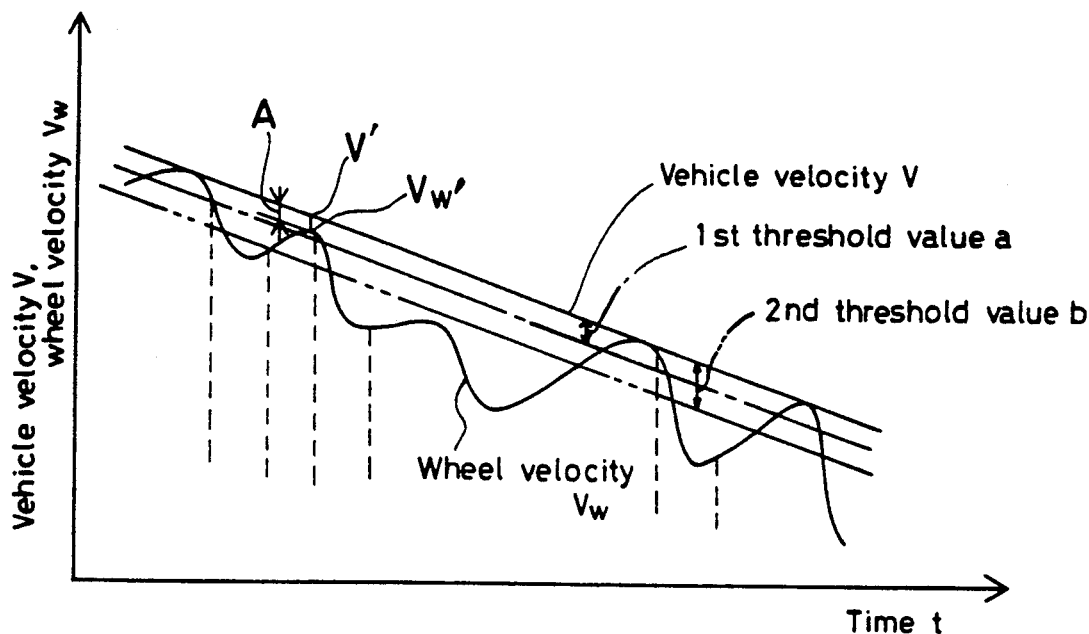
FIGS. 1(a) and 1(b) are a diagram illustrating an embodiment of an antiskid brake control method according to the present invention.
Figure 1:
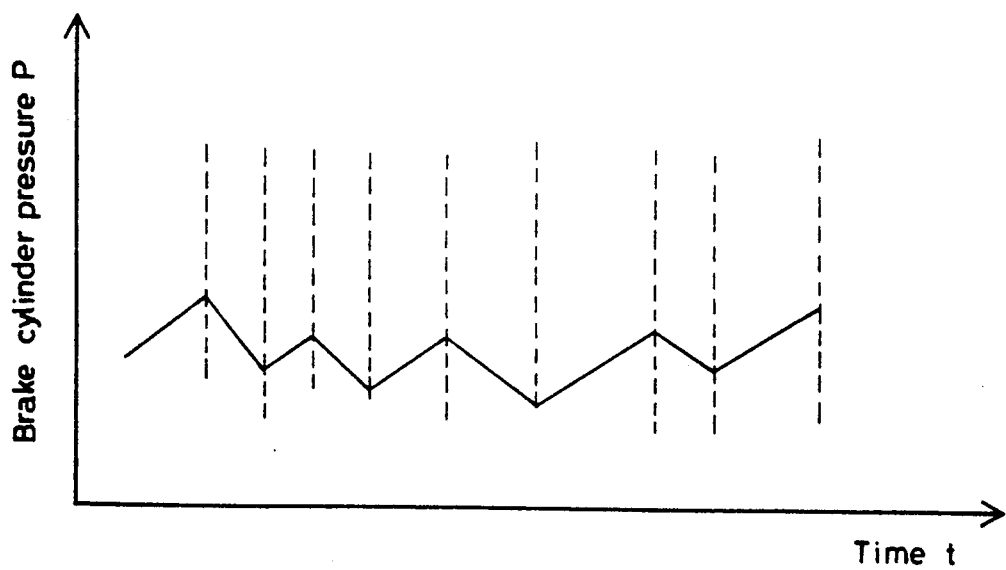

As illustrated in FIGS. 1(a) and 1(b), according to the embodiment of the invention, a vehicle velocity is estimated, such as based on wheel velocity in a conventional manner a first threshold value a spaced a fixed distance away from vehicle velocity V on the lower side thereof is set; and a second threshold value b spaced a fixed distance, which is greater than that of the first threshold value, away from the vehicle velocity V on the lower side thereof is set. The first and second threshold values a, b are represented by two lines, namely a one-dot chain line and a two-dot chain line, respectively, that are parallel to the vehicle velocity V.

During antiskid brake control, the difference A between vehicle velocity V' at maximum recovery velocity $V_W$ of wheel velocity $V_W$ and the maximum recovery velocity $V_W$ of the wheel velocity $V_W$ (i.e., obtained by subtracting $V_W$ from V') is compared with the first threshold value a and second threshold value b prevailing at this time. The next changeover point, at which the brake cylinder pressure is increased again in antiskid brake control, is controlled in dependence upon the results of the comparison operation.

Figure 2:
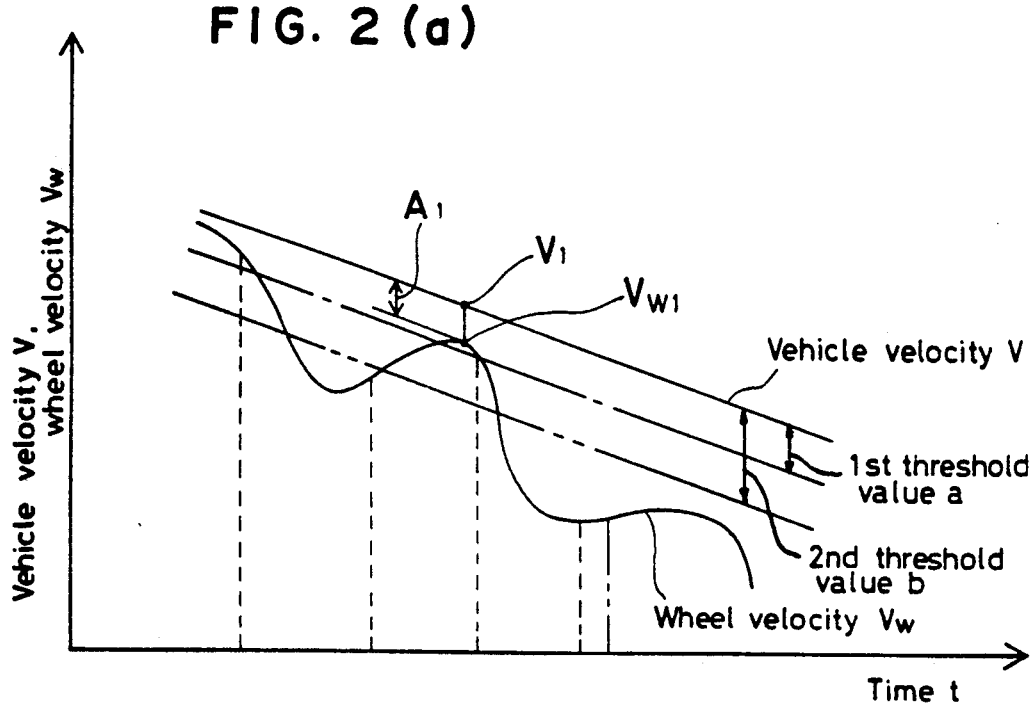
FIGS. 2(a) through 4(b) are diagrams for describing the details of this embodiment.
Figure 2B:
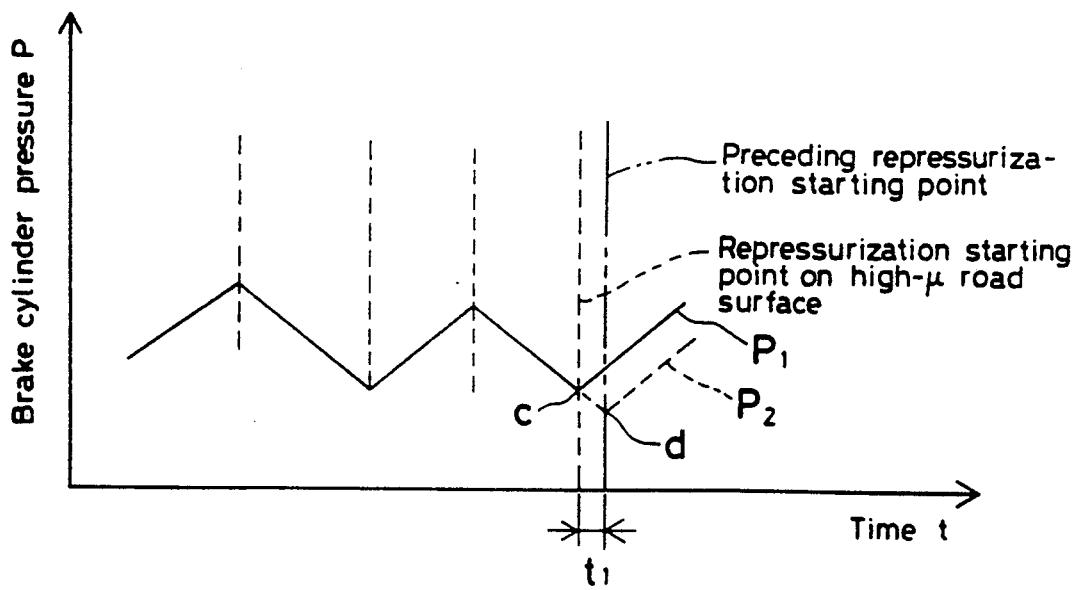

More specifically, as shown in FIGS. 2(a) and 2(b), when the difference $A_1$ between vehicle velocity $V_1$ at maximum recovery velocity $V_{W1}$ of wheel velocity $V_W$ and the maximum recovery velocity $V_{W1}$ of the wheel velocity is equal to or less than the first threshold value a, namely when $A_1 \leq a$ holds, during antiskid brake control, the next changeover point c, at which the brake cylinder pressure P is increased again, is changed so as to be made earlier, by time $t_1$, than the changeover point d at which the brake cylinder pressure was increased again the last time. It should be noted that when the difference $A_1$ is equal to or less than the first threshold value a, this is when the vehicle is traveling on a high-$\mu$ road surface. Accordingly, since the timing of the increase in brake cylinder pressure P1 occurs earlier for a high-$\mu$ road surface, the braking force is increased sooner. As a result, braking distance is shortened and brake feeling enhanced.

Figure 3A:
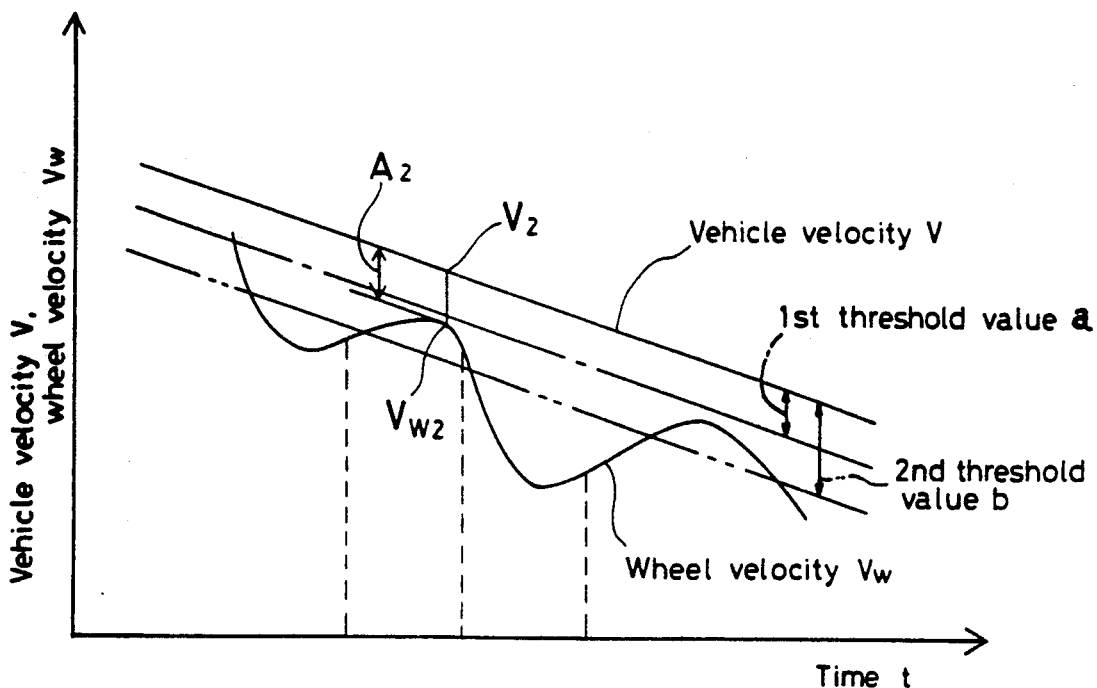
Figure 3B:
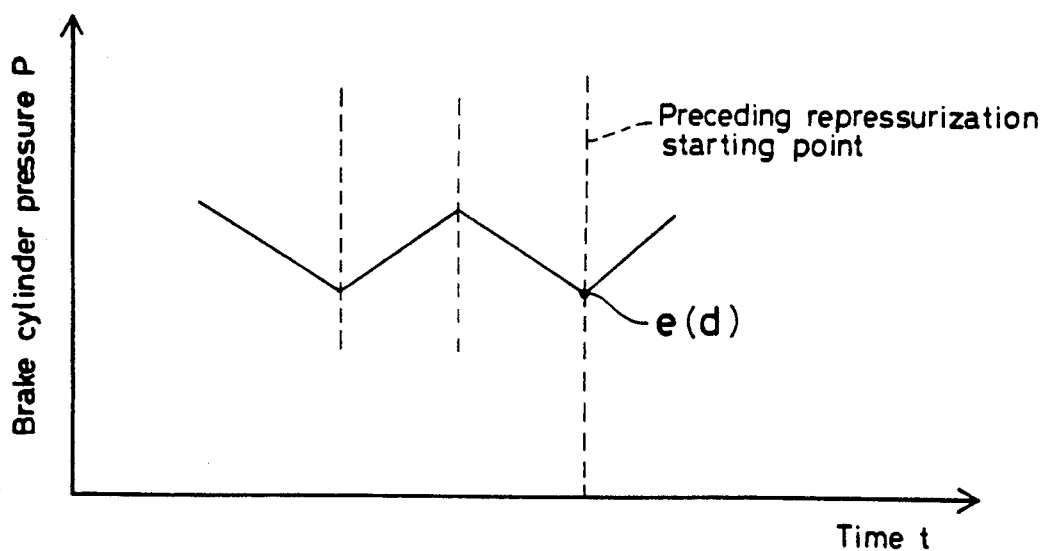

As shown in FIGS. 3(a) and 3(b), when the difference $A_2$ between vehicle velocity $V_2$ at maximum recovery velocity $V_{W2}$ of wheel velocity $V_W$ and the maximum recovery velocity VW2 of the wheel velocity is greater than the first threshold value a and equal to or less than the second threshold value b, namely when $a < A_2 \leq b$ holds, during antiskid brake control, the next changeover point e, at which the brake cylinder pressure P is increased again, is maintained at the changeover point d at which the brake cylinder pressure was increased again the last time.

Figure 4A:
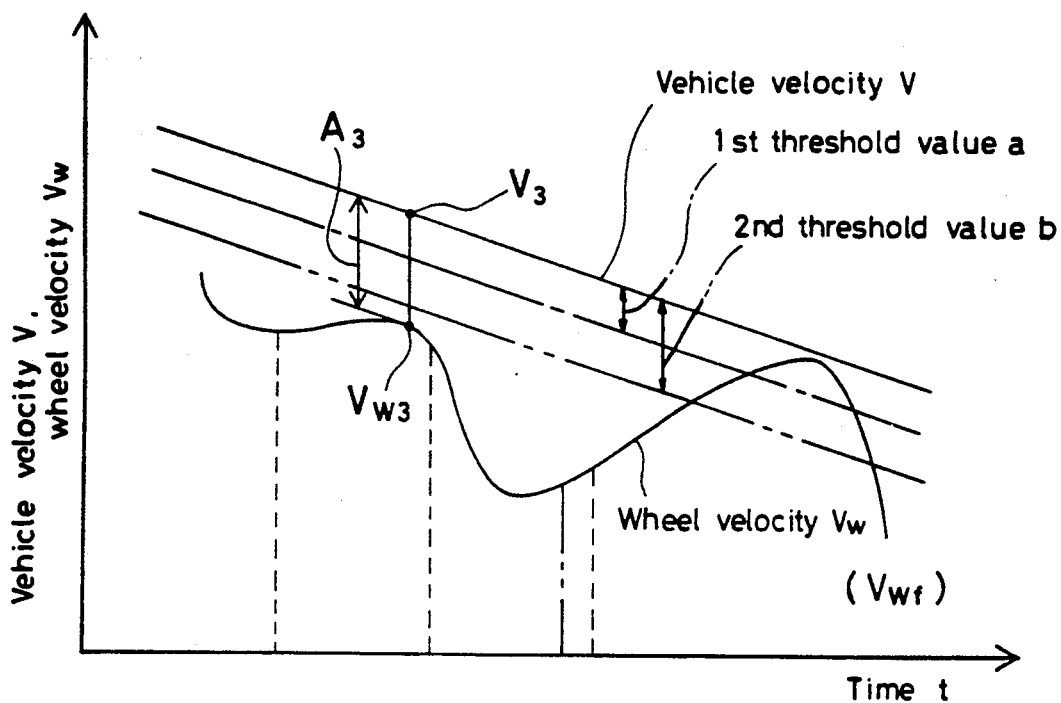
Figure 4B:
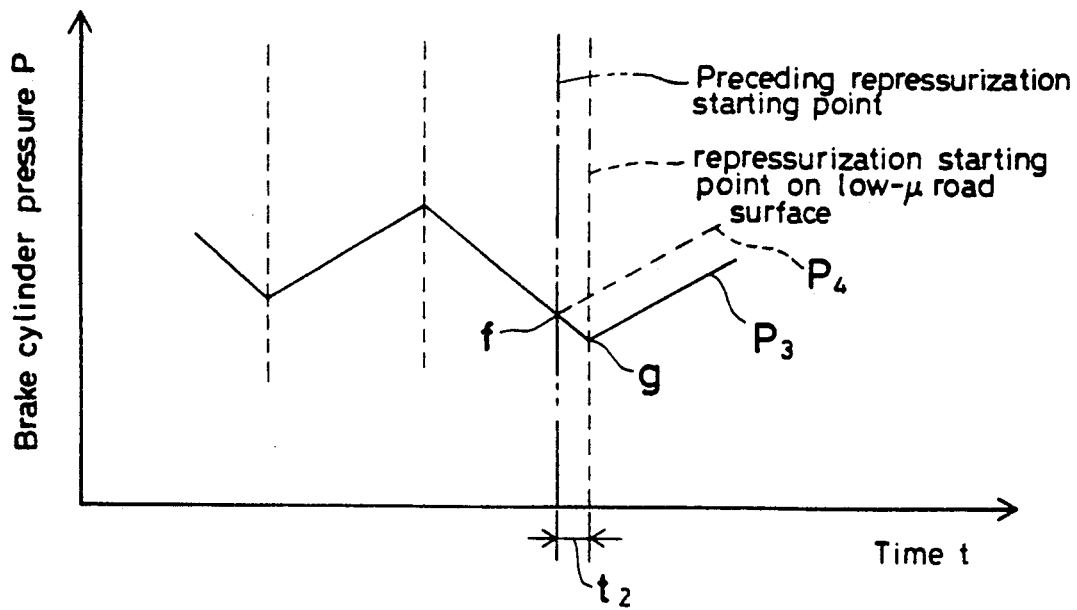

As shown in FIGS. 4(a) and 4(b), when the difference $A_3$ between vehicle velocity $V_3$ at maximum recovery velocity $V_{W3}$ of wheel velocity $V_W$ and the maximum recovery velocity VW3 of the wheel velocity $V_W$ is greater than the second threshold value b, namely when $A_3 > b$ holds, during antiskid brake control, the next changeover point g, at which the brake cylinder pressure P is increased again, is changed so as to be made later, by time $t_2$, than the changeover point f at which the brake cylinder pressure was increased again the last time.

When the difference $A_3$ between vehicle velocity $V_3$ at maximum recovery velocity $V_{W3}$ of wheel velocity $V_W$ and the maximum recovery velocity $V_{W3}$ of the wheel velocity $V_W$ is greater than the second threshold value b during antiskid brake control, this is when the vehicle is traveling on a low-$\mu$ road surface. Accordingly, since the timing of the increase in brake cylinder pressure P3 occurs later for a low-$\mu$ road surface, the braking force is increased at a later time. As a result, wheel velocity $V_W$ recovers by a comparatively large amount and becomes as close to the vehicle velocity V as possible. In particular, front-wheel velocity $V_{wf}$ approaches the vehicle velocity V, whereby steering of the vehicle is enhanced.

Figure 5:
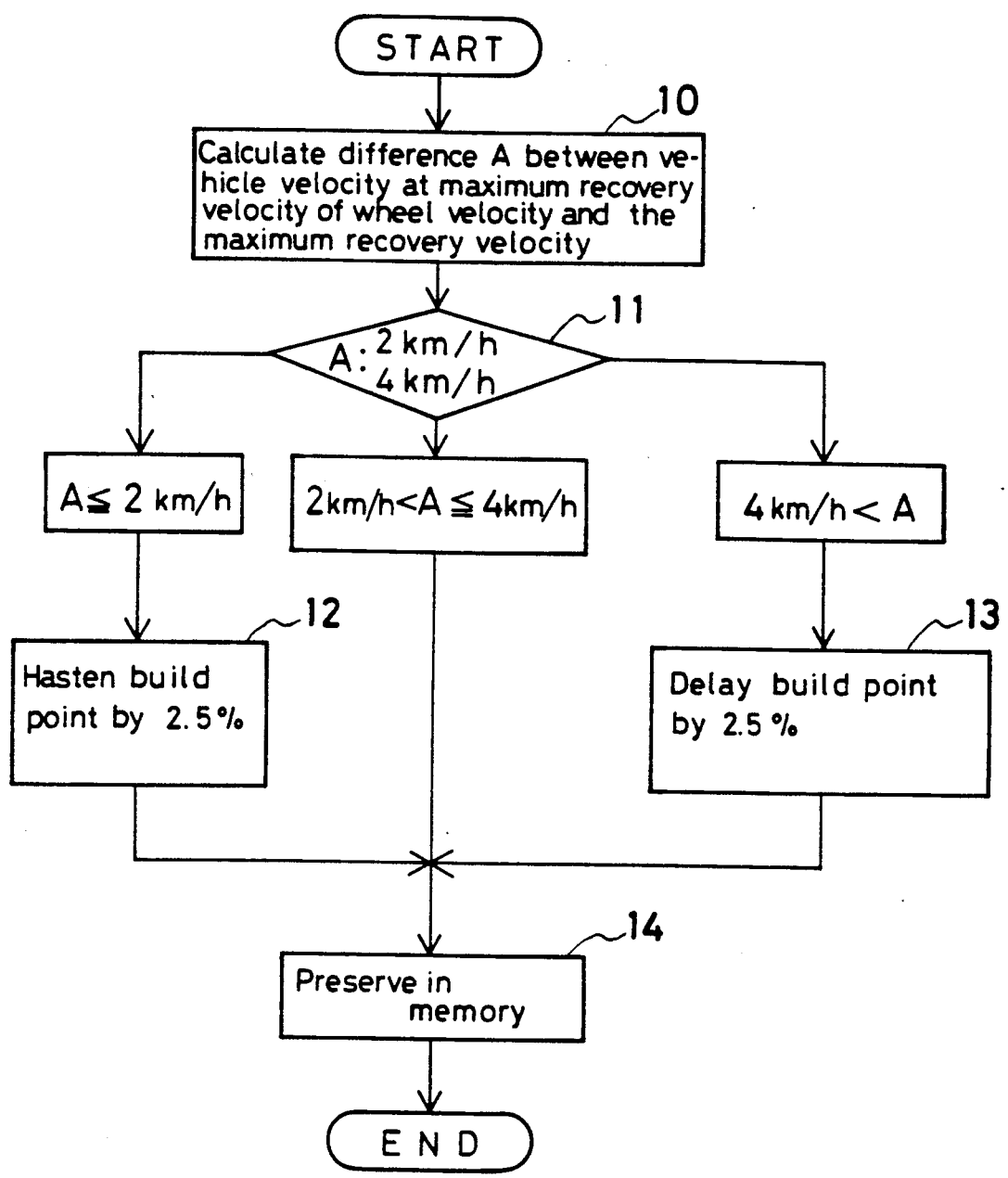
FIG. 5 is a flowchart of antiskid brake control according to the embodiment.
Figure 6A:
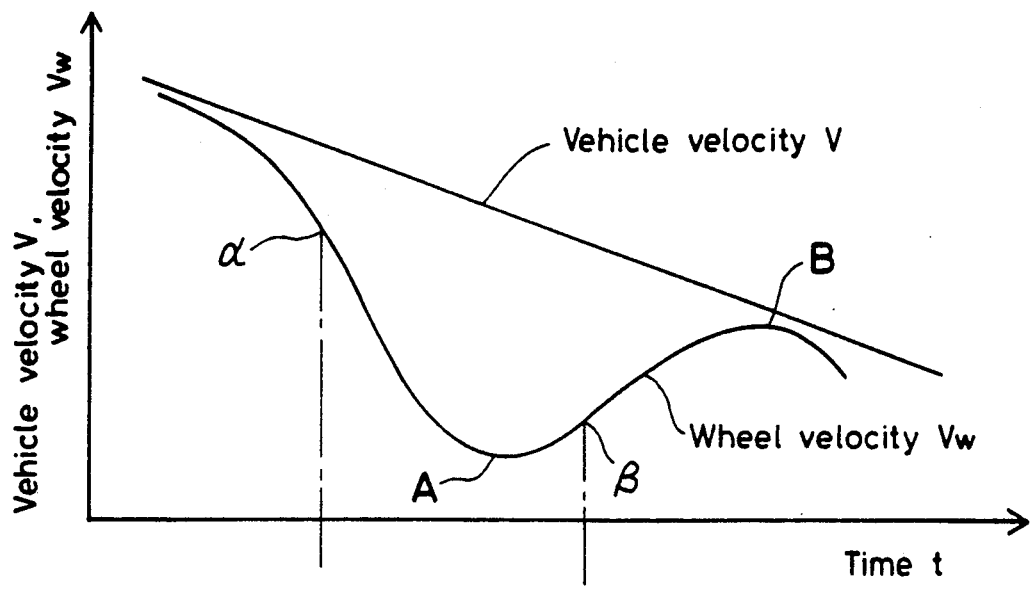
FIGS. 6(a) and 6(b) are a diagram illustrating an example of an antiskid brake control method according to the prior art.
Figure 6B:
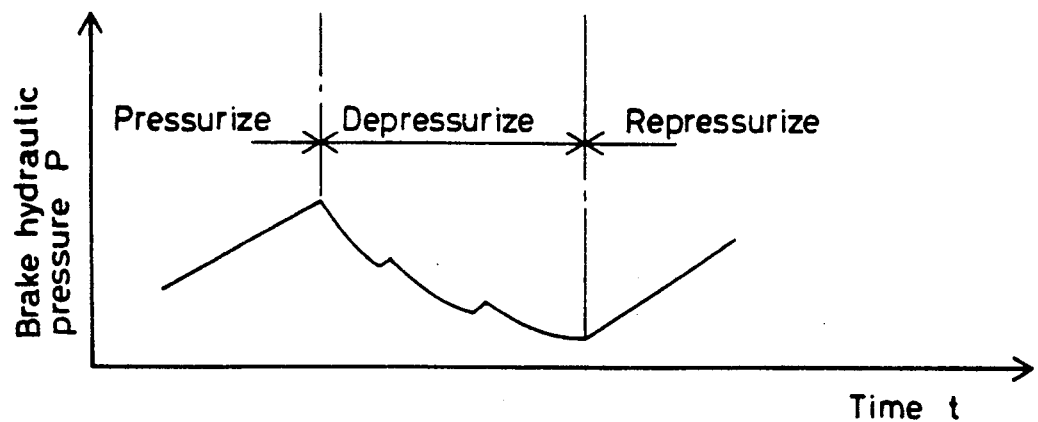

FIG. 5 is a flowchart illustrating control of antiskid braking described above.

In control according to this flowchart, the first threshold value a is set at 2 km/h, and the second threshold value b is set at 4 km/h. Step 10 of the flowchart calls for calculation of the difference A between the vehicle velocity at maximum recovery velocity of the wheel velocity and the maximum recovery velocity. At step 11, this difference is compared with 2 km/h and 4 km/h, namely with the first threshold value a and second threshold value b. When the difference A is equal to or less than the first threshold value 2 km/h, the point, namely the build point, at which the changeover is made to repressurization of the brake cylinder is changed at step 12 so as to occur 2.5% earlier than the preceding built point.

When the difference A is greater than the first threshold value 2 km/h and equal to or less than the second threshold value 4 km/h, the build point is not changed. Accordingly, the preceding build point is maintained. When the difference A is greater than the second threshold value 4 km/h, the build point is changed at step 13 so as to occur 2.5% later than the preceding build point. The set build point is preserved in the memory of an electronic control unit (ECU) for antiskid brake control at step 14 and is used when the next changeover is made to repressurization of the brake cylinder.

The present invention is not limited to the foregoing embodiment but can be modified in various ways. For example, the foregoing embodiment is for a case where brake cylinder pressure is changed over directly from reduced pressure to increased pressure again. However, the invention is applicable also to control in which reduced brake cylinder pressure is held temporarily at a predetermined pressure and then changed over to increased pressure again thereafter.

Thus, in accordance with the antiskid brake control method of the present invention, as described above, the point at which the brake cylinder is changed over to repressurization is controlled reliably in conformity with a change in the condition of the road surface. This makes it possible to perform more appropriate antiskid brake control.

In particular, the changeover point to repressurization of the brake cylinder is hastened when the vehicle is traveling on a high-$\mu$ road surface, and therefore the braking force is increased at an earlier time, thereby enhancing the brake feeling. Conversely, the changeover point is delayed when the vehicle is traveling on a low-$\mu$ road surface, and therefore the braking force is increased at a later time. As a result, steering can be improved by making the front-wheel velocity in particular approach the vehicle velocity to the maximum extent.

What we claim is:

1. A method for performing anti-skid brake control of an automotive vehicle by repeating operations of decreasing brake cylinder pressure of a wheel when skidding of the wheel is detected at braking and increasing brake cylinder pressure again when wheel velocity of the wheel recovers and elimination of skidding of the wheel is detected, comprising the steps of:

estimating vehicle velocity based on wheel velocity, and setting a first threshold value of a first fixed amount of vehicle velocity;

setting a second threshold value of a second fixed amount of vehicle velocity, said second fixed amount of vehicle velocity being greater than said first fixed amount of vehicle velocity of said first threshold value;

calculating a difference by subtracting maximum recovery velocity of wheel velocity from vehicle velocity at maximum recovery velocity of wheel velocity, and comparing said difference with said first and second threshold values; and altering a time period for an ensuing changeover point for increasing the brake cylinder pressure again based on results of the comparison by reducing said time period when said difference is equal to or less than said first threshold value, unaltering said time period when said difference is greater than said first threshold value and equal to or less than said second threshold value, and increasing said time period when said difference is greater than said second threshold value.

2. A method for performing anti-skid brake control of an automotive vehicle by repeating operations of decreasing brake cylinder pressure of a wheel when skidding of the wheel is detected at braking, and increasing brake cylinder pressure again when wheel velocity of the wheel recovers and elimination of skidding of the wheel is detected, comprising the steps of:

estimating vehicle velocity based on wheel velocity, and setting a first threshold value of a fixed amount of vehicle velocity;

setting a second threshold value of a second fixed amount of vehicle velocity, said second fixed amount of vehicle velocity being greater than said fist fixed amount of vehicle velocity of said first threshold value;

calculating a difference by subtracting maximum recovery velocity of wheel velocity from vehicle velocity at maximum recovery velocity of wheel velocity, and comparing said difference with said first and second threshold values;

determining a value of friction coefficient of road surface based on results of the comparison, and altering a time period for an ensuing changeover point for increasing the brake cylinder pressure again according to the determined value of friction coefficient.

3. A method for performing anti-skid brake control according to claim 2, wherein said road surface is determined to have high friction coefficient when said difference is equal to or less said first threshold value, said road surface is determined to have medium friction coefficient when said difference is equal to or less than said first threshold value, and said road surface is determined to have low friction coefficient when said difference is greater than said second threshold value.

4. A method for performing anti-skid brake control according to claim 3, wherein said time period is reduced when said road surface is determined to have said high friction coefficient, said time period is not altered when said road surface is determined to have said medium friction coefficient, sand said time period is increased when said road surface is determined to have said low friction coefficient.

* * * * *